W. H. PIKE, Jr.
CONTROLLING DEVICE FOR POWER DRIVEN MACHINES.
APPLICATION FILED FEB. 3, 1906.
1,050,388. Patented Jan. 14, 1913.
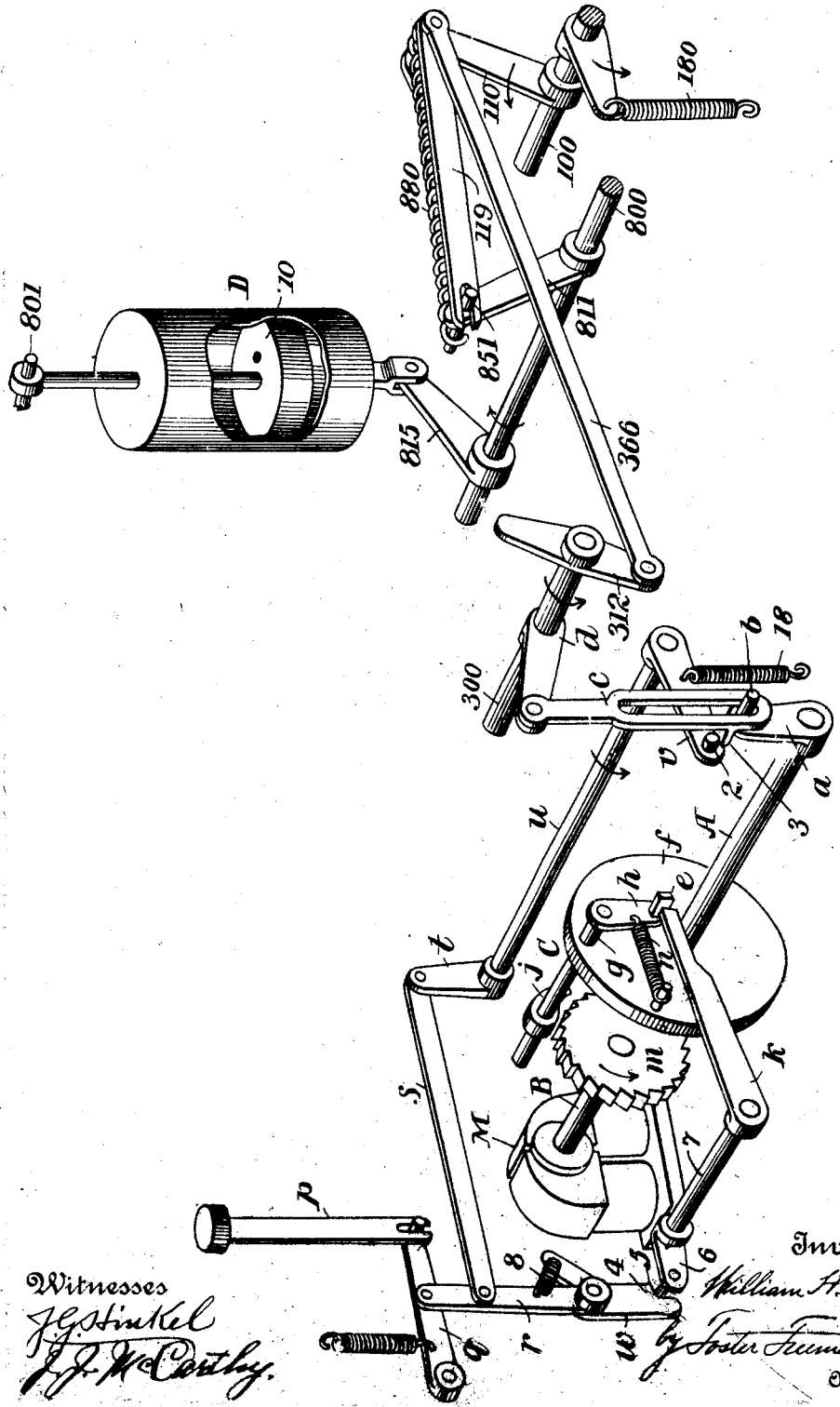

UNITED STATES PATENT OFFICE.

WILLIAM H. PIKE, JR., OF SOUTH ORANGE, NEW JERSEY, ASSIGNOR, BY MESNE ASSIGNMENTS, TO BURROUGHS ADDING MACHINE COMPANY, OF DETROIT, MICHIGAN, A CORPORATION OF MICHIGAN.

CONTROLLING DEVICE FOR POWER-DRIVEN MACHINES.

1,050,388.  Specification of Letters Patent.  Patented Jan. 14, 1913.

Application filed February 3, 1906. Serial No. 299,370.

*To all whom it may concern:*

Be it known that I, WILLIAM H. PIKE, Jr., a citizen of the United States, residing at South Orange, in the county of Essex and State of New Jersey, have invented certain new and useful Improvements in Controlling Devices for Power-Driven Machines, of which the following is a specification.

In some classes of machines, as for instance, in adding machines, it is desirable to limit the speed of movement of the working shaft which operates the working parts of the machine, and which shaft, in turn, is operated from an actuating shaft capable of a greater speed of movement. The object in thus limiting the movement of the working shaft is to prevent a sudden or improper movement of the actuating shaft from driving the working parts too rapidly, and generally a dash-pot is used to properly regulate the movements of the working shaft.

This invention relates to the use in connection with an apparatus so controlled, of a continuously rotating driving shaft capable of being connected by clutch mechanism with the working shaft, and the invention has for its object to disconnect the machine from the driving shaft at the end of each rotation and allow the working parts to complete their movements in case the speed of rotation of the driving shaft is in excess of that permitted by the action of the dash-pot.

A further object is to connect the members of a clutch mechanism by the action of a starting key and to insure the separation of said members at each complete rotation and until the starting key is again depressed.

In the drawing, there is shown in perspective only the parts required to embody the improvement in connection with a shaft herein termed the working shaft, and which may be connected in any way to operate any required mechanism.

The particular arrangement of parts shown is specially applicable to the adding machine illustrated in W. S. Burroughs's Letters Patent No. 504,963, and I have therefore given to the parts of my improved mechanism that correspond to parts of said machine the same designating figures as are used in the said Letters Patent.

The working shaft 800 is rocked by rotation of the driven member of the clutch through intermediate yielding connections. Thus, the driven shaft A supports the driven member *f* of a clutch device C, which consists of said member *f*, the driving member *m* in the form of a ratchet wheel, a rock shaft *g* carried by the driven member *f* and carrying a pawl *j*, and an arm *h* having a lug *e* and thrown in one direction by a spring *n*. The member *m* is on a driving shaft B rotated continuously from a suitable motor M. The two members *m f* of the clutch are connected when the pawl *j* engages the ratchet member *m*, and may be disconnected by carrying a stop arm *k* into such position that the lug *e* will make contact with the arm, thereby rotating the shaft *g* and throwing out the pawl. The stop arm *k* is lifted by depressing a key *p*. The rocking of the shaft 800 in the direction of its arrow is effected from the driven member of the clutch through any suitable yielding means. As shown, it is moved from a rotating crank shaft A, imparting movement to what I term an actuating rock shaft 300. The latter moves the shaft 800 through the medium of an arm 312, a connecting rod 366 jointed to an arm 110 on a countershaft 100, an arm 811 on the the shaft 800, and a spring 880 intermediate the arms 811 and 110. An arm 815 on the shaft 800 is connected to the bottom of a d  i-pot D, the piston rod of which is connected to a fixed pivot 801 and carries a perforated piston 10.

A blade 119 is pivoted to the arm 110 and is forked at the other end to receive a pin 851 upon the arm 811, and a spring 180 connected to an arm on the shaft 100 tends to carry the said arm in the direction of its arrow.

The movements of the working parts of the machine by the rocking of the shaft 800 are limited by the speed of movement of the dash pot D (which is partially filled with liquid) in respect to its perforated piston 10.

On starting any action of the machine, the actuating shaft 300 is rocked in the direction of its arrow, swinging back the arm 110, drawing on the spring 880, turning the shaft 800 and carrying down the dash pot at the speed permitted by the flow of the liquid through the opening in the piston.

On the return movement when the shaft 300 rocks in the reverse direction, the working shaft will be rocked in a reversed direction by the action of the fork 119 and the dashpot will be raised at the speed permitted by the flow of the liquid through the opening in the piston. It will be evident, however, that if the shaft 300 starts upon a second reciprocation before the shaft 800 comes to rest, the mechanism would get out of unison and the parts would be injured or their operation impaired, and provision is therefore made whereby the driven member of the clutch is brought to a stationary position at the end of each rotation and so as not to be again started until the working parts have returned to normal strating position. This result I effect by providing means whereby the stop device, as the arm k, after being shifted to permit the driven member of the clutch to begin its rotation is automatically carried back to stop position so as not to be moved therefrom until the shaft 800 has returned to its starting position, and so that the said stop device cannot be shifted until the key p has returned to normal position and is again depressed. While different means may be employed to secure this result, I will describe those which operate effectively with the adding machine before referred to.

As shown, the driven shaft A connected with the driven member of the clutch carries a crank arm a, the pin b of which enters a slot in a link c connected to an arm d upon the shaft 300 and an arm v upon the shaft u carries a stud 2 which extends over a shoulder 3 of the link c. The key p operates an arm q from which hangs a blade r, the lower section w of which is pivoted to the upper section and retained in line by a spring 8, and has a shoulder 4 adapted to engage a pin 5 on a crank arm 6 on the shaft 7 carrying the stop arm k. An arm t on the shaft u is connected by a rod s with the blade r. These parts are so arranged that prior to starting, the shoulder 3 is in contact with the stud 2. On depressing the key, the shaft 7 is rocked and the stop arm k raised to permit the pawl j to engage the member m and start the machine. As soon as the shaft A begins its rotation, the shoulder 3 is removed from the stud 2, and the shaft u is rocked in the direction of its arrow by a spring 18, thrusting forward the rod s and carrying the blade r out of engagement with the pin 5 so that the arm k at once falls to stop position when it will contact with the lug e and stop the machine as the driven member f completes its rotation. If the key p should be released and again depressed before the operations of the machine are completed, it will have no effect on the stop arm, as the blade r can only act on the arm k when the shaft 800 has resumed its starting position and lifted the link c to a position to rock back the shaft u and permit the blade r to swing over the pin 5. Further, if after depressing the key p and starting the machine, the key is retained down, the parts of the clutch will be disconnected on the completion of a rotation of the driven member of the clutch because the key is automatically disconnected from the stop arm, and the stop arm takes its stop position immediately after the members of the clutch are engaged an can only be set to releasing position after first raising the key. If the key was held down until the link c approached its upper position, the draft of the rod s on the blade r would bind the blade against the pin 5 and interfere with the parts taking their proper position. I therefore provide for a yielding connection shown in the form of a pivoted lower section of the blade r.

While I have shown a clutch device of a special character positive in its action, it will be understood that other forms of clutch devices may be used as friction clutches, with like effect in the described combination.

Without limiting myself to the construction shown, I claim:—

1. The combination with the working shaft, a motor, and an intermediate clutch of a stop device for arresting the driven clutch member, means for shifting the stop device to control connection of the clutch members, said stop being automatically restored to stop position after the driven member begins its rotation, and means for preventing the action of the shifting means on the stop device until the driven member has been arrested by the stop.

2. The combination with the working shaft, a motor and an intermediate clutch of a stop device for arresting the driven clutch member, means for shifting the stop device to control connection of the clutch members, said stop being automatically restored to stop position after the driven member begins its rotation, and means for preventing the action of the shifting means of the stop device until the driven member has been arrested by the stop, and preventing second shifting of the stop device by the shifting means until after the latter is restored to normal position.

3. The combination with a working shaft of a motor, a clutch having its driving member connected with the motor and its driven member connected with the working shaft, rock shaft, a stop carried by said rock shaft for arresting movement of the driven clutch member, a starting key, means operated the key for rocking the rock shaft to move the stop from engagement with the driven clutch member, and means operative during the rotation of the driven clutch member prevent movement of the rock shaft by the starting key.

4. The combination with a working shaft, of a motor, a clutch having its driving member connected with the motor and its driven member connected with the working shaft, a pivotally mounted arm rotatable with the driven clutch member, and controlling the connection of said member with the driving member, a stop normally engaging said arm to hold it in position to disengage the clutch members, and means for shifting the stop from the path of said arm, said stop being automatically restored to the path of said arm during each rotation of the driven member.

5. The combination with a working shaft, of a motor, a clutch having its driving member connected with the motor and its driven member connected with the working shaft, spring impelled means for connecting said clutch members including an arm rotatable with the driven member, a stop adapted to engage said arm and hold it in position to disengage the clutch members and a starting key for shifting the stop from the path of said arm, said stop being automatically restored to the path of said arm before the latter has completed a rotation independent of the return to normal position of the starting key.

6. The combination with a working shaft, of a motor, a clutch having its driving member connected with the motor and its driven member connected with the working shaft, a stop for arresting movement of the driven clutch member, a starting key, means actuated by said key for moving the stop from operative position, a rock shaft connected with the driven clutch member, and connections between said shaft and the key actuated means whereby the latter will be moved out of position to affect the stop as the driven clutch member rotates.

7. The combination with a working shaft, of a motor, a clutch having its driving and driven members connected respectively with the motor and working shaft, spring impelled means acting constantly to effect engagement of the clutch members, a stop adapted to render said means inoperative, manually adjustable means for shifting said stop to permit engagement of the clutch members, said stop being automatically returned to normal position before the driven clutch member has completed a rotation, and means preventing a second shifting of the stop by said manually adjustable means until the rotation of the driven clutch member has been arrested.

8. The combination with a working shaft, of a motor, a clutch having its driving and driven members connected respectively with the motor and working shaft, and a detent controlling engagement and disengagement of the members of the clutch and preventing the driven clutch member from making more than one complete rotation during an engagement thereof with the driving member.

9. The combination of a motor, a ratchet wheel connected thereto for continuous rotation, a rotary member having movably mounted thereon a pawl and a controlling arm therefor, a spring tending to engage the pawl with the ratchet wheel, a stop arm normally engaging said pawl arm in opposition to the spring, a key and connections for displacing said stop arm, means controlled by the said rotary member for effecting restoration of the stop arm to position for engaging the pawl arm as said member completes a cycle of movement, and a working shaft operatively connected to said rotary member.

In testimony whereof I affix my signature in presence of two witnesses.

WILLIAM H. PIKE, Jr.

Witnesses:
ARTHUR PENTECOST,
E. C. BATVILLE.